US010094332B2

(12) United States Patent
Cerra et al.

(10) Patent No.: US 10,094,332 B2
(45) Date of Patent: Oct. 9, 2018

(54) CORE COWL FOR A TURBOFAN ENGINE

(71) Applicant: The Boeing Company, Chicago, IL (US)

(72) Inventors: David F. Cerra, Woodinville, WA (US); Paul Robert Tretow, Mukilteo, WA (US); Robert H. Willie, Bothell, WA (US); Abhishek Sahay, Everett, WA (US)

(73) Assignee: The Boeing Company, Chicago, IL (US)

( * ) Notice: Subject to any disclaimer, the term of this patent is extended or adjusted under 35 U.S.C. 154(b) by 1197 days.

(21) Appl. No.: 14/476,685

(22) Filed: Sep. 3, 2014

(65) Prior Publication Data
US 2016/0061115 A1    Mar. 3, 2016

(51) Int. Cl.
F02K 1/48      (2006.01)
B64D 33/04     (2006.01)
F02K 1/34      (2006.01)
F02K 1/46      (2006.01)
B64C 21/10     (2006.01)
(Continued)

(52) U.S. Cl.
CPC ............... *F02K 1/48* (2013.01); *B64C 21/10* (2013.01); *B64D 33/04* (2013.01); *B64D 33/06* (2013.01); *F02K 1/46* (2013.01); *B64C 2230/08* (2013.01); *B64C 2230/14* (2013.01); *F02K 3/04* (2013.01); *F02K 3/06* (2013.01); *F05D 2250/181* (2013.01); *F05D 2250/182* (2013.01); *F05D 2250/183* (2013.01); *F05D 2250/184* (2013.01);
(Continued)

(58) Field of Classification Search
CPC ..... F02K 1/46; F02K 1/48; F02K 3/04; F02K 3/06; F05D 2250/181; F05D 2250/184; F05D 2250/294; F05D 2260/96; B64D 33/04; B64D 33/06; B64D 21/10; B64D 2230/08; B64D 2230/14; B64C 21/10; B64C 2230/08; B64C 2230/14
See application file for complete search history.

(56) References Cited

U.S. PATENT DOCUMENTS 3,967,443 A      7/1976  McMurtry
4,786,016 A  *  11/1988  Presz, Jr. .................. B63B 3/38
                                                    138/37
(Continued)

FOREIGN PATENT DOCUMENTS

EP    0244334 A2    11/1987
EP    0953506 A2    11/1999
(Continued)

OTHER PUBLICATIONS

United Kingdom Intellectual Property Office, Combined Search and Examination Report under Sections 17 and 18(3) in U.K. Patent Application No. GB1619788.1, dated Jan. 6, 2017, 5 pages.
(Continued)

*Primary Examiner* — Ehud Gartenberg
*Assistant Examiner* — James McGlynn
(74) *Attorney, Agent, or Firm* — Kolisch Hartwell, P.C.

(57) ABSTRACT

A core cowl for a turbofan engine may include a plurality of valleys formed in an outer surface of the core cowl. Each valley may include a convex portion upstream of a concave portion, and may be configured to disrupt a shock cell exiting a fan nozzle of the turbofan engine. Associated methods for reducing turbofan engine noise are also described.

15 Claims, 4 Drawing Sheets

(51) Int. Cl.
*F02K 3/04* (2006.01)
*F02K 3/06* (2006.01)

(52) U.S. Cl.
CPC ....... *F05D 2250/294* (2013.01); *Y02T 50/671* (2013.01)

(56) References Cited

U.S. PATENT DOCUMENTS

| | | | | |
|---|---|---|---|---|
| 4,819,425 | A * | 4/1989 | Farquhar | F02K 1/48 60/226.1 |
| 6,178,740 | B1 | 1/2001 | Su et al. | |
| 6,640,537 | B2 * | 11/2003 | Tse | F02K 1/34 181/220 |
| 6,672,067 | B2 | 1/2004 | Farmer et al. | |
| 7,762,057 | B2 | 7/2010 | Sloan et al. | |
| 7,870,722 | B2 | 1/2011 | Birch et al. | |
| 7,963,099 | B2 * | 6/2011 | Renggli | F02K 1/386 60/262 |
| 8,166,768 | B2 | 5/2012 | Birch et al. | |
| 8,291,689 | B2 | 10/2012 | Baltas | |
| 8,418,437 | B2 * | 4/2013 | Oba | B64D 29/06 60/226.1 |
| 9,511,873 | B2 * | 12/2016 | Mengle | B64D 33/06 |
| 2008/0217101 | A1 | 9/2008 | Crosta et al. | |
| 2008/0271431 | A1 | 11/2008 | Porte | |
| 2013/0206865 | A1 | 8/2013 | Szydlowski et al. | |
| 2014/0127010 | A1 | 5/2014 | Rose et al. | |

FOREIGN PATENT DOCUMENTS

| | | |
|---|---|---|
| EP | 1340901 A2 | 9/2003 |
| FR | 2907853 A1 | 5/2008 |
| RU | 2153591 C2 | 7/2000 |
| WO | 2008045035 A1 | 4/2008 |

OTHER PUBLICATIONS

Munday, David et al., "Flow Structure of Supersonic Jets From Conical C-D Nozzles." 39th AIAA Fluid Dynamics Conference, San Antonio, TX, Jun. vol. 24. 2009., 21 pages.

United Kingdom Intellectual Property Office, Combined Search and Examination Report under Sections 17 and 18(3) in U.K. Patent Application No. GB1515073.3, dated Feb. 5, 2016, 8 pages.

\* cited by examiner

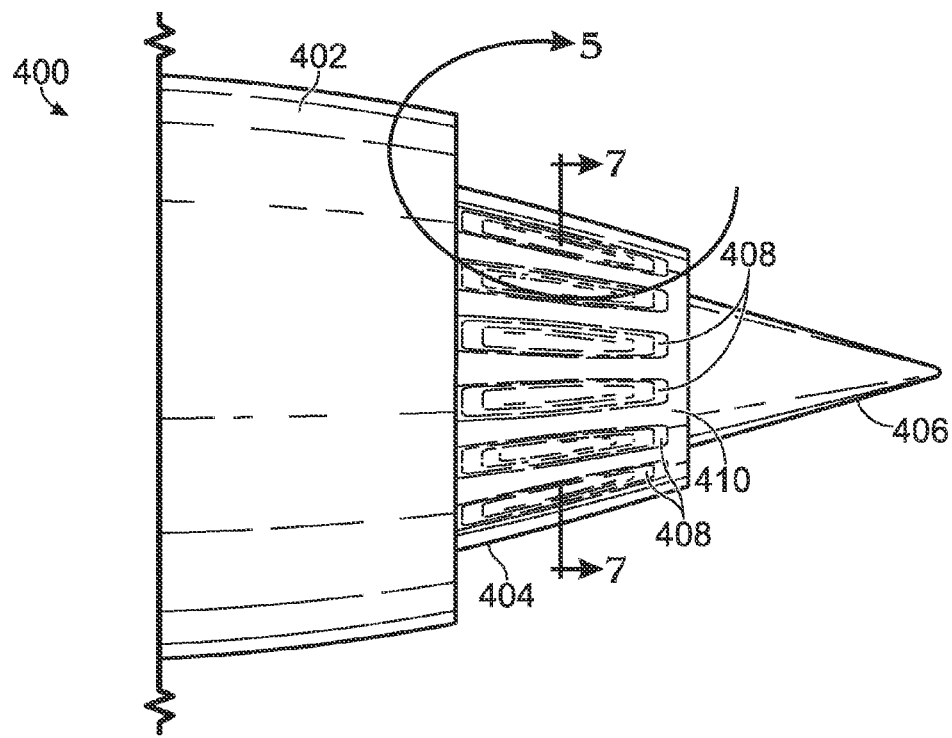
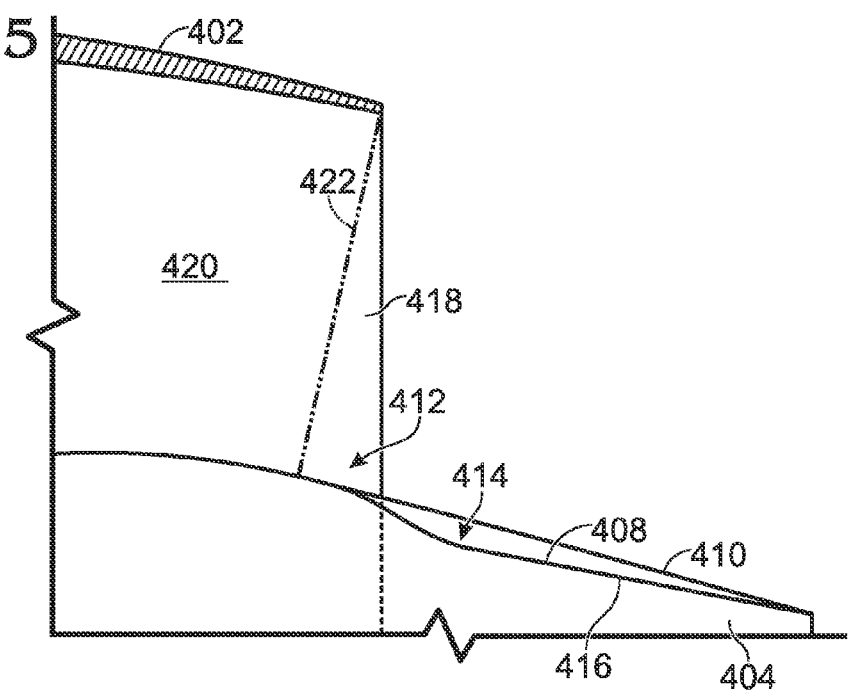

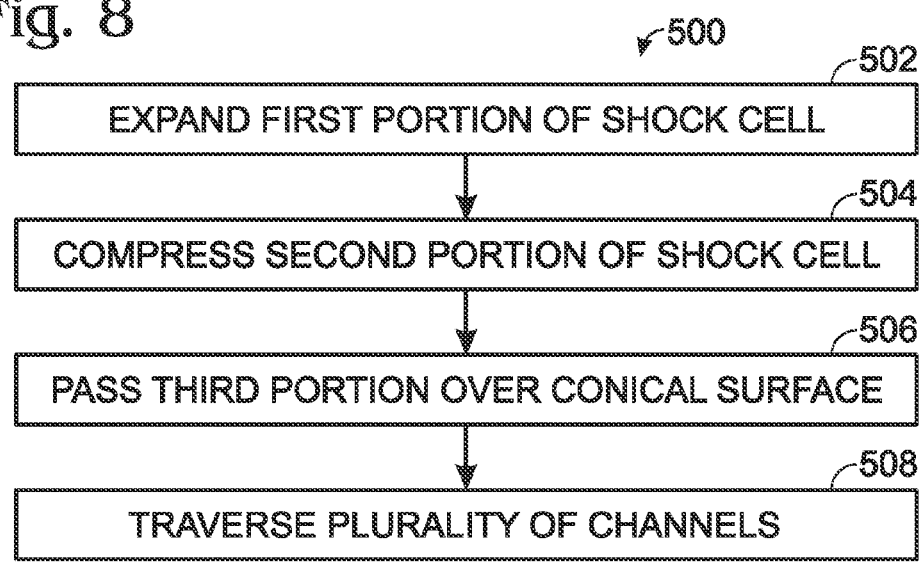

CORE COWL FOR A TURBOFAN ENGINE

CROSS-REFERENCES

The following related applications and materials are incorporated herein, in their entireties, for all purposes: U.S. Pat. No. 9,546,618.

FIELD

This disclosure relates to noise reduction with respect to a turbofan engine. More specifically, the disclosed embodiments relate to apparatus and methods for disrupting shock cell patterns exiting the fan nozzle of a turbofan.

INTRODUCTION

Aircraft manufacturers and airlines are under pressure to reduce aircraft noise to satisfy increasingly stringent noise abatement and certification requirements. As a major contributor to overall aircraft noise, aircraft engines are a clear choice for noise reduction efforts. High bypass ratio turbofan engines have resulted in significantly quieter operation, and have become the dominant type of engine for commercial aircraft. High bypass ratio turbofans derive a significant fraction, even a large majority, of their total thrust from bypass air which is propelled around the core of the engine by a forward-mounted fan. The fan, in turn, is powered by one or more turbines driven by the jet engine, which also provides some thrust. While this approach has significantly reduced aircraft noise when compared with pure turbojet engines and low bypass ratio engines, engine and aircraft federal regulations nevertheless continue to require further engine noise reductions.

SUMMARY

The present disclosure provides a device for a turbofan jet engine comprising a core cowl having a conical surface extending beyond a fan nozzle exit; and a plurality of elongate depressions formed in the conical surface, each elongate depression extending generally from a proximal end portion of the conical surface to a distal end portion of the conical surface. In some embodiments, a turbofan nozzle may include a fan sleeve at least partially surrounding a core cowl, an annular fan nozzle being generally defined between the fan sleeve and the core cowl; wherein the core cowl includes a conical surface and a plurality of valleys formed in the conical surface, each valley including an expansion region disposed upstream of a compression region, such that the core cowl is configured to reduce a shock strength of a shock cell pattern flowing over the core cowl. In some embodiments, a method for reducing noise caused by a turbofan engine may include disrupting a shock cell exiting an annular fan nozzle by expanding a first portion of the shock cell by impinging the first portion upon a convex surface of a core cowl; and compressing a second portion of the shock cell by impinging the second portion upon a concave surface of the core cowl disposed downstream of the convex surface.

The features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 4 is a side view of an aft portion of an illustrative turbofan engine having shock cell-disruptive features in accordance with aspects of the present disclosure.

FIG. 5 is a schematic partial side view taken at line 5 of FIG. 4, showing various contours and relationships between selected portions of a nozzle and core cowl in accordance with aspects of the present disclosure.

FIG. 8 is a flow chart depicting steps of an illustrative method for reducing noise caused by a turbofan engine.

DESCRIPTION

Overview

Figure 1:
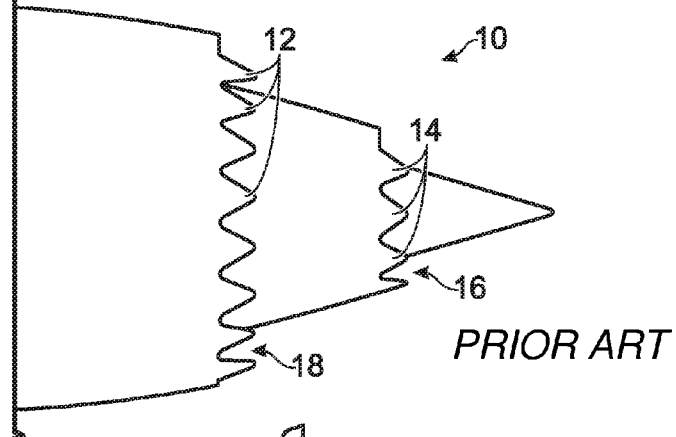
FIG. 1 is a schematic side view of an aft portion of an illustrative turbofan engine with nozzle structures having a plurality of chevrons.

Various embodiments of a core cowl having a contoured surface configured to disrupt shock cells are described below and illustrated in the associated drawings. Unless otherwise specified, a core cowl and/or fan nozzle of a turbofan engine and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other components of turbofan engines. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

With engines of commercial aircraft, shock cells may be generated as the flow of gases exits an engine nozzle. Fan airflow may be supersonic. Shock cells may be generated, for example, when portions of the exiting fan flow lose energy and fluctuate below and above the speed of sound. Shock cell noise may result, especially during a cruise segment of flight. More specifically, these shock cells contribute to the noise level within the cabin as the pattern of exiting shock cells interacts with a shear layer between the plume and the ambient air flowing past the engine. To reduce the noise experienced from the shock cells, insulation may be added to the cabin. However, this option adds undesirable weight to the aircraft.

Alternatively or additionally, chevrons may be formed on the outer sleeve of the nozzle to disrupt the cohesive nature of the shock cells, thereby reducing interaction between the shock cell pattern and the shear layer. Chevrons attack shear layer mixing between the propulsion (i.e., fan) stream and the free (i.e., ambient) stream. By mixing the flows early (e.g., at the nozzle exit), the interaction between the shock cell pattern and the shear layer is reduced, thus decreasing noise generated by the shock cells. However, the addition of chevrons introduces energy losses (e.g., drag) and again adds weight, as well as increased complexity and cost.

During the cruise regime of a flight, airflow at the exit of the fan nozzle of a turbofan engine typically has a supersonic velocity (i.e., mach number greater than 1; this may also be described as a nozzle pressure ratio greater than 1.89). Immediately upon exit, portions of the airflow drop below supersonic speed and/or fluctuate above and below supersonic level due to expansion. Cohesive shock cells form, and cause noise as explained above, by interacting with the shear layer between the fan nozzle airflow and ambient air. Patterns of shock cells also result. Disrupting cohesion or otherwise reducing the strength of these shock cells is therefore desirable.

The exit of the fan nozzle is defined generally between the trailing edge of the fan sleeve and a corresponding location on the underlying core cowl. The core cowl extends beyond this exit, while the fan sleeve does not. Accordingly, fan airflow in general and shock cells in particular will continue to interact with the core cowl after exiting the nozzle. Typical core cowls take the form of a truncated cone, and have a substantially smooth, conical outer surface.

A shock cell-disruptive core cowl in accordance with aspects of the present disclosure may include a plurality of depressions in its otherwise conical outer surface. Each of the depressions, also referred to as valleys, channels, grooves, and/or corrugations, includes a first region near the nozzle exit. The first region may be shaped in a way that tends to expand a shock cell impinging upon it, and accordingly the first region may be referred to as an expansion or over-expansion region. For example, the first region may have a convex shape that slopes generally away from the standard outer cone toward a centerline of the cowl. This shape may tend to "fan out" a pressure cell that bounces, rebounds, or ricochets off, or is otherwise redirected by the convex surface.

A second region of the valley may be formed downstream of the first region. This region may also be said to follow the first region or to be distal relative to the first region. The second region may be shaped in a way that tends to compress a shock cell impinging upon it. Accordingly, the second region may be referred to as a compressive region, a compression region, and/or an over-compression region. For example, the second region may have a concave shape that slopes generally away from the centerline of the cowl. This shape may tend to "focus" or compress a pressure cell that bounces, rebounds, or ricochets off, or is otherwise redirected by the concave surface.

Causing the initial shock cell to pass over the expansion region, the compression region, and/or the unmodified portion of the conical surface may result in a reduced shock cell strength and/or may disrupt the cohesiveness of the shock cell structures.

Further examples regarding illustrative core cowl features are described in further detail below.

EXAMPLES, COMPONENTS, AND ALTERNATIVES

The following examples describe selected aspects of exemplary shock cell-disruptive core cowls as well as related systems and/or methods. These examples are intended for illustration and should not be interpreted as limiting the entire scope of the present disclosure. Each example may include one or more distinct inventions, and/or contextual or related information, function, and/or structure.

Example 1

This example describes an illustrative turbofan engine nacelle having chevrons; see FIG. 1.

In this example, FIG. 1 shows a side elevation view of a nacelle 10 including illustrative chevrons generally indicated at 12 and 14. Chevrons 12 and 14 are designed to operate as described above, including increasing the amount of mixing between the high velocity gases exiting the engine, and the surrounding ambient air stream (also referred to as "freestream" air). Chevrons such as chevrons 12 and 14 generally include triangular serrations or protrusions on the nozzle lip.

Chevrons typically have some curvature in the lengthwise cross-section, which partially immerses them in the adjacent flow. Each chevron may project either inward or outward, by an amount that is typically on the order of the upstream boundary layer thickness on the inner or outer surface, respectively. The chevron planform may be triangular, trapezoidal, or rectangular.

Nacelle 10 includes a core flow duct 16 through which the engine core flow is directed, and a fan flow duct 18 arranged annularly around core flow duct 16. Fan air passes through the fan flow duct, as described further below. The exit aperture of fan flow duct 18 may include fan flow chevrons 12, and the exit aperture of core flow duct 16 may include core flow chevrons 14, one set of chevrons for each of the flow boundaries caused by the fan and core engine flows, respectively.

Example 2

Figure 2:
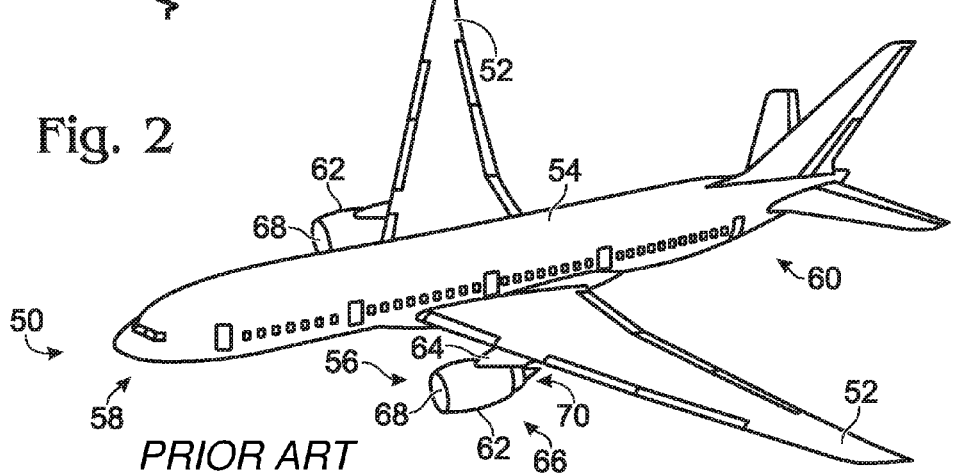
FIG. 2 is a perspective view of an illustrative aircraft having turbofan engines suitable for use with aspects of the present disclosure.

This example describes an illustrative aircraft suitable for use with aspects of the present disclosure; see FIG. 2.

FIG. 2 is a perspective view of an illustrative commercial jet aircraft 50 having wings 52, a fuselage 54, and a propulsion system 56. Fuselage 54 includes a nose portion 58 at the forward end of the fuselage, and a tail portion 60 at the aft end of the fuselage. Propulsion system 56 may include two turbofan engines 62, shown in FIG. 2 attached to wings 52 by pylons 64. In other embodiments, engines 62 may be carried or attached to fuselage 54 or other aircraft structures such as tail portion 60. More or fewer engines may be included, and other types of engines (e.g., turbojet) may be used. In the example shown, each engine 62 is housed in a nacelle 66, which includes an inlet 68 and a nozzle portion 70. Nozzle portions 70 may include particular features, discussed in greater detail below, that alter noise caused by the engine and/or alter the nozzle exit area in one or more selected manners.

Example 3

Figure 3:
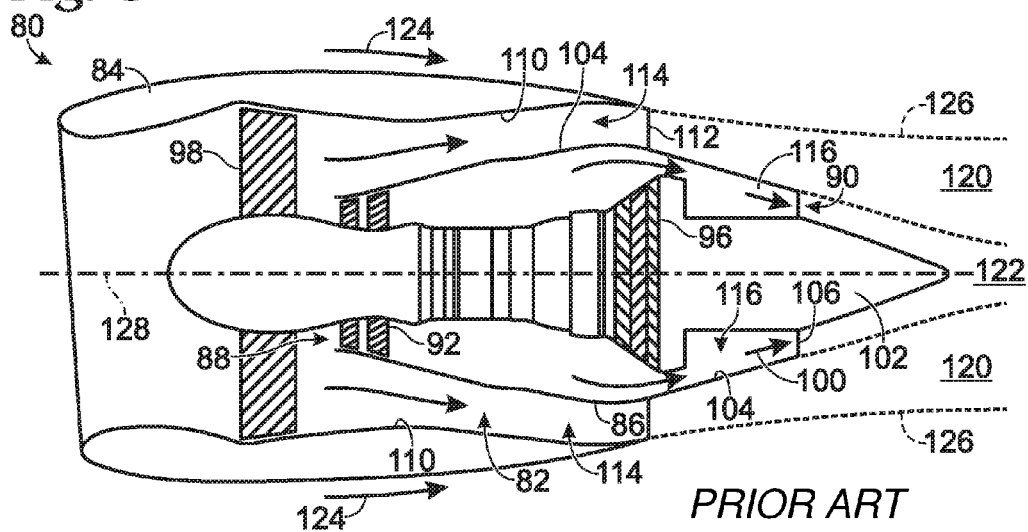
FIG. 3 is a schematic sectional side view of an illustrative turbofan engine.
Figure 6:
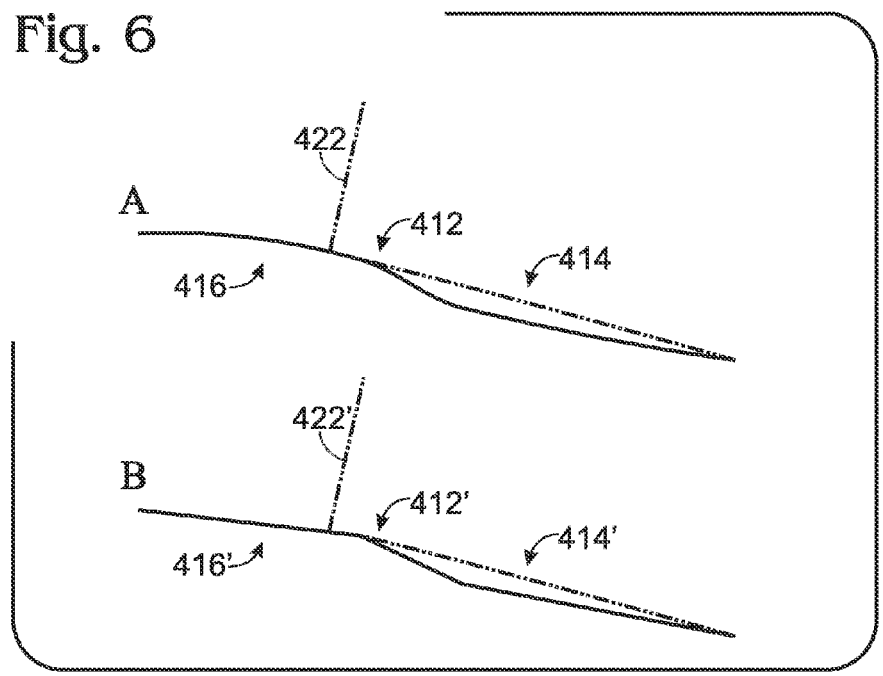
FIGS. 6A and 6B show two examples of core cowl contours in accordance with aspects of the present disclosure.

This example describes an illustrative turbofan nacelle suitable for use with aspects of the present disclosure; see FIG. 3.

FIG. 3 is a simplified, schematic, cross-sectional side elevation view of a nacelle 80 (which is an example of nacelle 66), and an associated engine 82. For purposes of illustration, many of the internal features of the engine are shown schematically and/or in a simplified format. Nacelle 80 includes an outer housing or fan cowl, also referred to as a fan sleeve 84. Engine 82 is mainly disposed within the fan cowl, and includes an engine cowl 86 (also referred to as a core cowl) having a forward facing inlet 88 and a rear facing exit 90. A compressor 92 in the engine receives ambient intake air from inlet 88. Compressor 92 compresses the air and provides the pressurized air to a combustor 94. Compressor 92 may include multiple stages, and/or may include a low pressure compressor and a high pressure compressor.

Combustor 94 mixes the pressurized air with fuel, and ignites the mixture. This combustion creates a high temperature, highly pressurized working fluid that expands through a turbine 96. Turbine 96 may include one or more stages, and may be referred to as a multi-stage turbine. Turbine 96 may include separate portions or sections, one or more of which drives compressor 92 (e.g., via a connecting drive shaft) and another one or more of which drives a main fan 98 positioned upstream or forward of the compressor.

The working fluid and exhaust products pass from turbine 96 along a first or core flow path 100 around a nozzle exit cone 102, also referred to as a plug. Core flow path 100 is bounded externally by a first or inner wall 104 of engine cowl 86, and terminates at a core flow path exit 106 positioned aft of turbine 96.

Fan 98 drives bypass air around the engine core along a second or fan flow path 108. Fan flow path 108 is bounded internally by first wall 104 of the engine cowl, and externally by a second wall 110 of fan sleeve 84. Second wall 110 terminates at a fan flow path exit 112.

An annular fan nozzle 114 is formed between the fan sleeve and the engine cowl 86, and a core nozzle 116 is formed between the engine cowl 86 and the exit cone 102. Bypass air flow exits fan nozzle 114, and together with core working fluid flow exiting core nozzle 116 forms a plume 118. In the vicinity of the exit, plume 118 has a layered or laminar structure, including a fan exhaust layer 120 and a core exhaust layer 122. Fan exhaust layer 120 is travelling at a higher average velocity than an ambient air flow 124 flowing past nacelle 80, and thus a shear layer or boundary 126 is formed between fan exhaust layer 120 and ambient flow 124.

Accordingly, thrust is produced by both the core flow exiting the core nozzle 116 and the fan flow exiting the fan nozzle 114. Fan flow typically moves at a slower average velocity than core flow. However, the significantly greater volume of fan flow air leads to a higher contribution to thrust.

Nacelle and engine components are generally arranged in a coaxial manner. For reference, a centerline or central axis is indicated at 128 in FIG. 3. Additionally, a portion of core cowl 86 may extend axially beyond the aft end of fan sleeve 84 as shown in FIG. 3.

Example 4

This example describes an illustrative core cowl having shock cell-disruptive features; see FIGS. 4-7.

FIG. 4 is a side view of an aft portion of a turbofan jet engine 400 showing a fan sleeve 402, a core cowl 404, and a conical plug 406, all examples of the corresponding structures described in Example 3 above. Core cowl 404 includes valleys 408 formed in a conical surface 410 and distributed around the circumference of the cowl. Valleys 408 may also be referred to as depressions, elongate depressions, channels, corrugations, and/or grooves. Note that the size and shape of valleys 408 may be exaggerated in FIGS. 4-7 to facilitate discussion of contours and structure.

As shown in FIG. 4, a plurality of valleys 408 are formed in the outer conical surface of core cowl 404. Each valley 408 may be any suitable depression or indentation in the outer surface of core cowl 404 configured to disrupt a shock cell traveling across the cowl, also referred to as reducing a shock strength of a shock cell pattern flowing over the core cowl. In the exemplary core cowls shown in FIGS. 4-7, each valley 408 includes a convex expansion region 412 followed by a concave compression region 414. FIG. 5 shows an illustrative lengthwise contour 416 of one of valleys 408 as well as conical surface 410 of the core cowl. Because these contours run in the direction of airstream flow, they may be referred to as streamwise contours. Likewise, expansion region 412 may be described as being upstream of compression region 414.

With continuing reference to FIG. 5, a fan flow exit 418 is defined at the throat of a fan airflow nozzle 420, as indicated at 422. Nozzle 420 is formed between outer fan sleeve 402 and core cowl 404. Each valley 408 may extend generally from a proximal end portion of the conical surface of core cowl 404 to a distal end portion of the conical surface of core cowl 404. Contour 416 is formed in the core cowl downstream of exit 418. Contour 416 may be formed in core cowl 404 entirely downstream of exit 418, because shock cells are typically not formed until fan airflow exits nozzle 420.

Contour 416 includes a curvilinear expansion region 412 continuous with a curvilinear compression region 414, resulting in a curvilinear overall continuous contour. In other words, contour 416 may be axially curvilinear. This arrangement is reproduced in part for comparison purposes in FIG. 6A. In another example, shown in FIG. 6B, a contour 416' may include expansion and compression regions (412' and 414') having polygonal or sharp-cornered profiles. In other examples, contour 416 may include a combination of curvilinear and polygonal regions.

Figure 7:
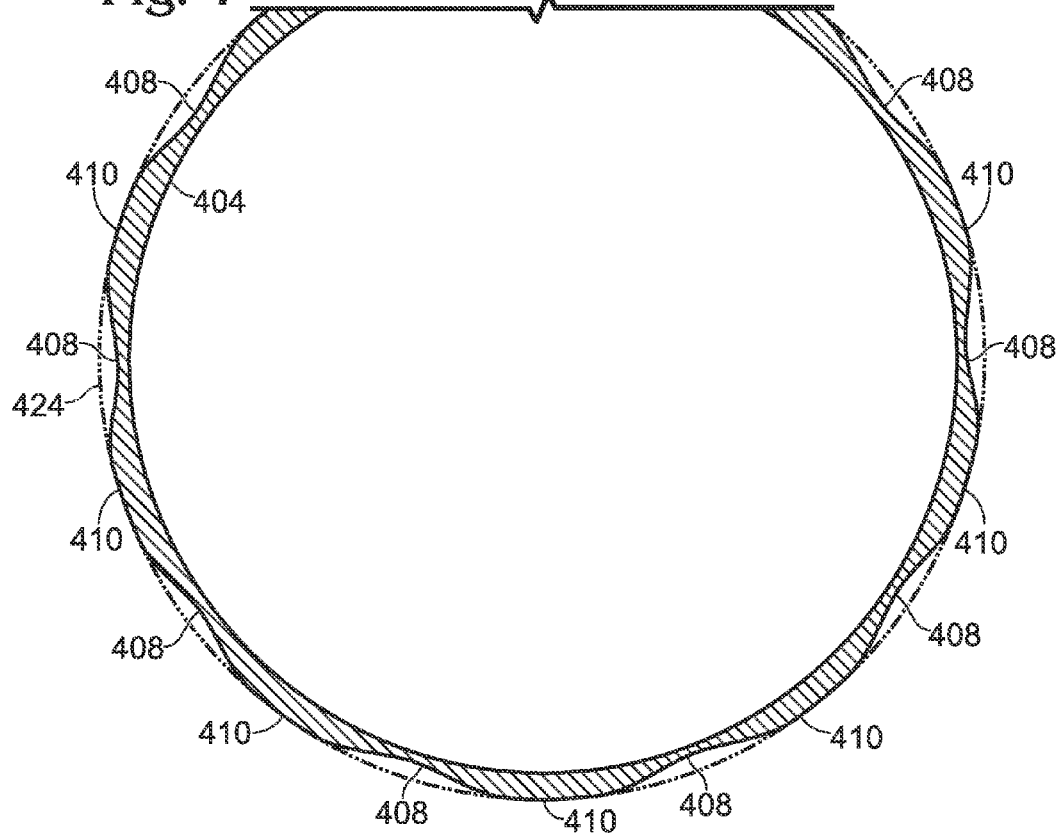
FIG. 7 is a sectional end view of an illustrative core cowl schematically taken at line 7-7 of FIG. 4.

Turning to FIG. 7, a sectional end view of core cowl 404 shows that valleys 408 may be formed in a sinusoidal pattern around at least a portion of the circumference of the outer surface of the cowl. In other words, a transverse section of the core cowl may have a sinusoidal perimeter. A phantom line indicates an unmodified conical surface 424. Portions or expanses of the unmodified conical outer surface 410 of cowl 404 separate adjacent valleys 408. In some examples, at least two of valleys 408 may be substantially identical to each other. While all of the valleys are shown as substantially identical to each other in FIG. 7, valleys 408 may have any suitable shape and depth, and may be of different shapes and/or depths on the same core cowl. Additionally, more or fewer valleys 408 may be included without varying from the teachings of this disclosure. In some examples, valleys 408 may be evenly spaced around a portion of the perimeter of the conical surface of core cowl 404. In some examples, the depressions may not occur in a periodic manner. In some examples, channels on an upper portion of the cowl may be wider (or a have a larger circumferential extent) and/or deeper than channels on a lower portion (or vice versa). In some examples, depressions may vary based on proximity to the pylon.

Example 5

This example describes aspects of a method for reducing noise caused by a turbofan engine; see FIG. 8.

FIG. 8 is a flowchart illustrating steps performed in an illustrative method, and may not recite the complete process or all steps of the process. FIG. 8 depicts multiple steps of a method, generally indicated at 500, which may be performed in conjunction with a core cowl constructed according to aspects of the present disclosure. Although various steps of method 500 are described below and depicted in FIG. 8, the steps need not necessarily all be performed, and in some cases may be performed in a different order than the order shown.

Generally speaking, method 500 includes disrupting a shock cell travelling along the core cowl. The shock cell is a component of the stream exiting a fan airflow nozzle of a turbofan engine.

At step 502, a first portion of the shock cell may be expanded by impinging the first portion upon a convex surface of the core cowl. For example, the shock cell may travel through a valley having an expansion region as described above. At step 504, a second portion of the shock cell may be compressed by impinging the second portion upon a concave surface of the core cowl disposed downstream of the convex surface.

For example, the shock cell may continue through the valley, encountering the compression region as described above. The first and second portions of the shock cell may not be mutually exclusive, and some or all of the expanded portion may be compressed during the process.

At step 506, a third portion of the shock cell may be passed over a conical surface of the core cowl laterally adjacent to the convex surface and the concave surface. For example, a portion of the shock cell may pass over the unmodified portion of the outer surface of the core cowl (e.g., between valleys). Accordingly, the same shock cell may experience cowl shapes having two or more effective diameters (e.g., an unmodified diameter made up of the "ridges" between valleys, and a modified diameter made up of the valley portions).

At step 508, the shock cell may be caused to traverse a channel including the convex and concave surfaces of the expansion and compression regions, respectively. This channel may have a long axis that is oriented in the direction of air flow, also referred to as the streamwise direction. In some examples, the shock cell may be caused to traverse a plurality of such channels, and adjacent pairs of channels may be separated by an expanse of the unmodified core cowl.

In some examples, the plurality of channels may be evenly or axisymmetrically spaced around a circumference of the core cowl.

Illustrative Embodiment Descriptions

This section describes additional aspects and features of a shock cell-disruptive core cowl and related methods, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A device for a turbofan jet engine comprising a core cowl having a conical surface extending beyond a fan nozzle exit; and a plurality of elongate depressions formed in the conical surface, each elongate depression extending generally from a proximal end portion of the conical surface to a distal end portion of the conical surface.

A1. The device of paragraph A0, wherein each elongate depression comprises an expansion region and a compression region with respect to a shock cell traversing the core cowl, the expansion region being upstream of the compression region.

A2. The device of paragraph A1, wherein the expansion region is defined by a surface angled from the conical surface toward a central axis of the core cowl and the compression region is defined by a surface angled away from the central axis of the core cowl toward the conical surface.

A3. The device of paragraph A2, wherein the expansion region is generally convex and the compression region is generally concave.

A4. The device of paragraph A2, wherein the expansion region and the compression region form a continuous contour.

A5. The device of paragraph A4, wherein the contour is axially curvilinear.

A6. The device of paragraph A0, wherein the plurality of elongate depressions are evenly spaced around a portion of the perimeter of the conical surface.

A7. The device of paragraph A6, wherein a transverse section of the conical surface has a sinusoidal perimeter.

B0. A turbofan nozzle comprising a fan sleeve at least partially surrounding a core cowl, an annular fan nozzle being generally defined between the fan sleeve and the core cowl; wherein the core cowl includes a conical surface and a plurality of valleys formed in the conical surface, each valley including an expansion region disposed upstream of a compression region, such that the core cowl is configured to reduce a shock strength of a shock cell pattern flowing over the core cowl.

B1. The nozzle of paragraph B0, wherein the plurality of valleys in the conical surface are formed entirely downstream of an exit of the fan nozzle.

B2. The nozzle of paragraph B0, wherein at least two valleys of the plurality of valleys are substantially identical to each other.

B3. The nozzle of paragraph B0, wherein the expansion region includes a convex surface and the compression region includes a concave surface.

C0. A method for reducing noise caused by a turbofan engine, the method comprising: disrupting a shock cell exiting an annular fan nozzle by expanding a first portion of the shock cell by impinging the first portion upon a convex surface of a core cowl; and compressing a second portion of the shock cell by impinging the second portion upon a concave surface of the core cowl disposed downstream of the convex surface.

C1. The method of paragraph C0, further including passing a third portion of the shock cell over a conical surface of the core cowl laterally adjacent to the convex surface and the concave surface.

C2. The method of paragraph C0, further comprising causing the shock cell to traverse a channel, wherein the channel includes the convex surface and the concave surface.

C3. The method of paragraph C2, wherein a long axis of the channel is oriented in the direction of air flow.

C4. The method of paragraph C0, further comprising passing the shock cell through a plurality of channels formed in an outer surface of the core cowl, each one of the plurality of channels including a convex surface upstream of a concave surface.

C5. The method of paragraph C4, wherein adjacent ones of the plurality of channels are separated by an expanse of the core cowl.

C6. The method of paragraph C4, wherein the plurality of channels are axisymmetrically spaced around a portion of a circumference of the core cowl.

C7. The method of paragraph C0, wherein the convex surface is continuous with the concave surface.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

We claim:

1. A device for a turbofan jet engine comprising:
a core cowl having a conical surface extending beyond a fan nozzle exit wherein the conical surface has a first diameter at a forward end proximate a turbine and a second diameter aft of the fan nozzle exit, wherein the first diameter is larger than the second diameter; and
a plurality of elongate depressions formed in the conical surface, such that adjacent elongate depressions are separated by unmodified portions of the conical surface, each elongate depression extending generally from a proximal end portion of the conical surface to a distal end portion of the conical surface;
wherein each elongate depression comprises an expansion region shaped to expand an impinging shock cell and a compression region shaped to compress the impinging shock cell, the expansion region being upstream of the compression region; and
wherein the expansion region is defined by a first surface angled from the conical surface toward a central axis of the core cowl and the compression region is defined by a second surface angled toward the conical surface; and
wherein the expansion region is generally convex and the compression region is generally concave.

2. The device of claim 1, wherein the expansion region and the compression region form a continuous contour.

3. The device of claim 2, wherein the continuous contour is axially curvilinear.

4. The device of claim 1, wherein the plurality of elongate depressions are evenly spaced around a portion of a perimeter of the conical surface.

5. The device of claim 4, wherein a transverse section of the core cowl has a sinusoidal perimeter.

6. A turbofan nozzle comprising
a fan sleeve at least partially surrounding a core cowl, an annular fan nozzle being generally defined between the fan sleeve and the core cowl;
wherein the core cowl includes a conical surface having a first diameter at a forward end proximate a turbine and a second diameter aft of an exit of the fan nozzle, wherein the first diameter is larger than the second diameter, and a plurality of valleys formed in the conical surface such that adjacent valleys are separated by unmodified portions of the conical surface, each valley including an expansion region disposed upstream of a compression region, such that the core cowl is configured to reduce a shock strength of a shock cell pattern flowing over the core cowl; and
wherein the expansion region is defined by a first surface angled from the conical surface toward a central axis of the core cowl and the compression region is defined by a second surface angled toward the conical surface; and
wherein the expansion region includes a convex surface and the compression region includes a concave surface.

7. The nozzle of claim 6, wherein the plurality of valleys in the conical surface are formed entirely downstream of the exit of the fan nozzle.

8. The nozzle of claim 6, wherein at least two valleys of the plurality of valleys are substantially identical to each other.

9. A method for reducing noise caused by a turbofan engine, the method comprising:
disrupting a shock cell exiting an annular fan nozzle by expanding a first portion of the shock cell by impinging the first portion upon a first region of a core cowl having a conical surface with a first diameter at a forward end proximate a turbine, and a second diameter aft of an exit of the fan nozzle, wherein the first diameter is larger than the second diameter, the first region including a convex surface shaped to expand the first portion of the shock cell;
compressing a second portion of the shock cell by impinging the second portion upon a second region of the core cowl disposed downstream of the convex surface, the second region including a concave surface shaped to compress the second portion of the shock cell; and
passing a third portion of the shock cell over an unmodified portion of the conical surface laterally adjacent to the convex surface and the concave surface; and
wherein the convex surface is angled from the conical surface toward a central axis of the core cowl and the concave surface is angled toward the conical surface.

10. The method of claim 9, further comprising causing the shock cell to traverse a channel formed in a surface of the core cowl, wherein the channel includes the convex surface and the concave surface.

11. The method of claim 10, wherein a long axis of the channel is oriented in a direction of air flow.

12. The method of claim 9, further comprising passing the shock cell through a plurality of channels formed in an outer surface of the core cowl, each one of the plurality of channels including the convex surface upstream of the concave surface.

13. The method of claim 12, wherein adjacent ones of the plurality of channels are separated by an expanse of the core cowl.

14. The method of claim 12, wherein the plurality of channels are axisymmetrically spaced around a portion of a circumference of the core cowl.

15. The method of claim 9, wherein the convex surface is continuous with the concave surface.

* * * * *